United States Patent
Tamma et al.

(10) Patent No.: US 7,562,357 B2
(45) Date of Patent: Jul. 14, 2009

(54) RELATIONAL DATABASE SCHEMA VERSION MANAGEMENT

(75) Inventors: Leela S. Tamma, Fremont, CA (US); Krishna Vitaldevara, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 550 days.

(21) Appl. No.: 10/796,613

(22) Filed: Mar. 8, 2004

(65) Prior Publication Data

US 2005/0198630 A1  Sep. 8, 2005

(51) Int. Cl.
  G06F 9/44  (2006.01)
  G06F 12/00  (2006.01)

(52) U.S. Cl. .................. 717/170; 717/168; 707/200; 707/203

(58) Field of Classification Search ......... 717/120–123, 717/168–178; 707/200, 203
See application file for complete search history.

(56) References Cited

U.S. PATENT DOCUMENTS

| | | | | |
|---|---|---|---|---|
| 4,912,637 | A * | 3/1990 | Sheedy et al. ............... | 707/203 |
| 5,659,735 | A * | 8/1997 | Parrish et al. ................. | 707/10 |
| 5,765,171 | A * | 6/1998 | Gehani et al. ............... | 707/203 |
| 5,806,066 | A * | 9/1998 | Golshani et al. ............ | 707/100 |
| 6,216,136 | B1 * | 4/2001 | Ronstrom .................... | 707/203 |
| 6,415,299 | B1 * | 7/2002 | Baisley et al. ............... | 707/203 |
| 6,912,711 | B1 * | 6/2005 | Curtis et al. ................. | 717/173 |
| 6,947,945 | B1 * | 9/2005 | Carey et al. ................. | 707/102 |
| 6,970,876 | B2 * | 11/2005 | Hotti et al. ................... | 707/101 |
| 7,162,689 | B2 * | 1/2007 | Demers et al. .............. | 715/511 |
| 2002/0174142 | A1 * | 11/2002 | Demers et al. .............. | 707/509 |
| 2004/0103124 | A1 * | 5/2004 | Kupkova ..................... | 707/203 |
| 2005/0071359 | A1 * | 3/2005 | Elandassery et al. ........ | 707/102 |
| 2006/0004781 | A1 * | 1/2006 | Burgel et al. ................ | 707/100 |

OTHER PUBLICATIONS

Davison et al., "A Visual Interface for a Database with Version Management," 1986, ACM, p. 226-256.*
Conradi et al., "Version Models for Software Configuration Management," 1998, ACM, p. 233-282.*
"Oracle8i Distributed Database Systems Release 8.1.5," 1999, Oracle, p. 2-13.*
Lerner, Barbara Staudt, "A Model for Compound Type Changes Encountered in Schema Evolution," 2000, ACM, p. 83-127.*
"Basic Set Theory," <http://plato.stanford.edu/entries/set-theory/primer.html>, 2002, Stanford Encyclopedia of Philosophy.*
"Set Theory," <http://plato.stanford.edu/entries/set-theory/>, Jul. 2002, Stanford Encyclopedia of Philosophy.*

* cited by examiner

Primary Examiner—Wei Y Zhen
Assistant Examiner—Qing Chen
(74) Attorney, Agent, or Firm—Lee & Hayes, PLLC

(57) ABSTRACT

Techniques for managing multiple versions of relational database schema data are described. Schema data associated with multiple versions of a relational database are maintained according to a database schema version management structure. Laws of set theory are applied to the structured database schema data to identify data definition language (DDL) and data manipulation language (DML) scripts that are associated with a particular version of the relational database. The identified scripts are then copied into an installation file that can be executed to create a full install of the particular version of the relational database. Similarly, laws of set theory are applied to the structured database schema data to identify DDL scripts, DML scripts, and drop scripts that are to be applied to upgrade from one version of the relational database to a newer version of the relational database.

12 Claims, 15 Drawing Sheets

```xml
<?xml version="1.0" encoding="utf-8" ?>
<xs:schema xmlns="xsdDSVM"
           targetNamespace="xsdDSVM"
           xmlns:xs="http://www.w3.org/2001/XMLSchema">
    <xs:complexType name="SchemaDataType">
        <xs:attribute name="name"
                      type="xs:string"
                      use="required">
        </xs:attribute>
    </xs:complexType>
    <xs:complexType name="ReleaseType">
        <xs:sequence>
            <xs:element name="ddl"
                        type="SchemaDataType"
                        minOccurs="0"
                        maxOccurs="unbounded">
            </xs:element>
            <xs:element name="sproc"
                        type="SchemaDataType"
                        minOccurs="0"
                        maxOccurs="unbounded">
            </xs:element>
            <xs:element name="drop"
                        type="SchemaDataType"
                        minOccurs="0"
                        maxOccurs="unbounded">
            </xs:element>
        </xs:sequence>
        <xs:attribute name="version"
                      type="xs:unsignedLong"
                      use="required">
        </xs:attribute>
    </xs:complexType>
    <xs:complexType name="DSVMType">
        <xs:sequence>
            <xs:element name="Release"
                        type="ReleaseType"
                        minOccurs="1"
                        maxOccurs="unbounded">
            </xs:element>
        </xs:sequence>
    </xs:complexType>
    <xs:element name="DSVM" type="DSVMType"></xs:element>
</xs:schema>
```

*Figure 2*

```xml
<?xml version="1.0" encoding="utf-8" ?>
<ls:DSVM xmlns:ls="xsdDSVM" xmlns:xsi='http://www.w3.org/2001/
XMLSchema-instance' xsi:schemaLocation='xsdDSVM dsvm.xsd'>

<Release Version="1">
        <ddl name="Tables1.0.sql"/>
        <ddl name="SysMessages1.0.sql"/>
        <ddl name="Login1.0.sql"/>
        <sproc name="ProcA.sql"/>
        <sproc name="FuncA.sql"/>
        <sproc name="ProcB.sql"/>
        <sproc name="FuncB.sql"/>
    </Release>

<Release Version="2">
        <ddl name="UpgradeTables1.1.sql"/>
        <sproc name="ProcA.sql"/>
        <sproc name="ProcC.sql"/>
        <sproc name="FuncC.sql"/>
        <drop name="FuncA.sql"/>
    </Release>

<Release Version="3">
        <ddl name="UpgradeSysMessages1.2.sql"/>
        <sproc name="ProcB.sql"/>
        <sproc name="ProcD.sql"/>
    </Release>

<Release Version="4">
        <ddl name="UpgradeTables3.0.sql"/>
        <ddl name="UpgradeLogins3.0.sql"/>
        <sproc name="ProcA.sql"/>
        <sproc name="FuncC.sql"/>
        <sproc name="ProcE.sql"/>
        <sproc name="ProcF.sql"/>
        <drop name="ProcB.sql"/>
    </Release>

</ls:DSVM>
```

- 304 (Release Version 1)
- 306 (Release Version 2)
- 308 (Release Version 3)
- 310 (Release Version 4)
- 302

*Figure 3*

RELATIONAL DATABASE SCHEMA VERSION MANAGEMENT

TECHNICAL FIELD

This invention relates to relational database design and development, and more specifically to a methodology for managing versions of a relational database schema.

BACKGROUND

In software development, specifically relational database applications, maintaining a relational database schema through multiple releases of the database can be very cumbersome.

When a new version of a database is developed, prior to release of the database, an installation file associated with the new version must be created, which, when executed, will install from scratch, the new version of the database. In addition to an installation file, an upgrade file must be created that, when executed, will upgrade a previous version of the database to the new version of the database. Even more complicated is a scenario in which more than one previous version of the database exists. In this case, a different upgrade file is required to upgrade from each previous version of the database to the current version of the database. Furthermore, each installation file and upgrade file must be tested to insure that they all result in the same database structure.

Database installation files and upgrade files are typically generated manually by a database developer who is familiar with the intricacies of the database schema. This is a very time-consuming and error-prone method.

Accordingly, a need exists for a technique that enables automated generation of relational database installation and upgrade files.

SUMMARY

A technique for managing multiple versions of a relational database schema is described. Schema data associated with multiple versions of a relational database are maintained according to a database schema version management structure. The schema data identifies, for a particular version, data definition language (DDL) scripts, data manipulation scripts (DML), and drop scripts that are to be applied to upgrade from the previous version of the database to the particular version of the database.

Laws of set theory are applied to the database schema data to identify which DDL scripts and DML scripts are to be executed in order to create a full install of a particular version of the database. Similarly, laws of set theory are applied to the database schema data to identify which DDL scripts, DML scripts, and drop scripts are to be executed in order to upgrade from a given version of the database to a particular newer version of the database.

The identified scripts are copied into an installation file (or upgrade file), which can then be executed to perform the appropriate install (or upgrade).

BRIEF DESCRIPTION OF THE DRAWINGS

FIG. 2 is an XML schema definition (XSD) that defines the structure of an exemplary XML file that may be used to describe the schemas of multiple sequential versions of a relational database.

FIG. 3 is an XML file structured according to the XSD illustrated in FIG. 2 that describes the schemas of the four sequential versions of the relational database illustrated in FIG. 1.

DETAILED DESCRIPTION

Overview

The embodiments described below provide techniques for managing schema data associated with multiple sequential versions of a relational database such that script files can be automatically generated to create either a full install of any version of the relational database or an upgrade from one version of the database to any newer version of the database. In the described exemplary implementation, an XML schema definition (XSD) defines a structure for an XML file that is used to store metadata associated with the schemas of multiple sequential versions of a relational database. The metadata describes data definition language (DDL) files and data manipulation language (DML) files that are associated with each version of the relational database. The metadata for each version of the relational database is grouped into three categories: (1) DDL files, which include scripts to create, drop, or modify database objects such as tables, indexes, views, and so on; (2) create/alter DML files, which include scripts to create or modify data manipulation objects such as functions and stored procedures that are new or have changed from one version to another; and (3) drop DML files, which include scripts to drop data manipulation objects that were created in support of a previous version of the relation database, but that are no longer needed.

In the described exemplary implementation, laws of set theory are applied to the schema data that is maintained to generate a script file that contains the commands used to fully install a particular version of the relational database from scratch. Alternatively, laws of set theory may be applied to the schema data that is maintained to generate a script file that contains the commands used to upgrade an installed version of the database to a newer version of the database.

Relational Database Schema Version Management

Figure 1:
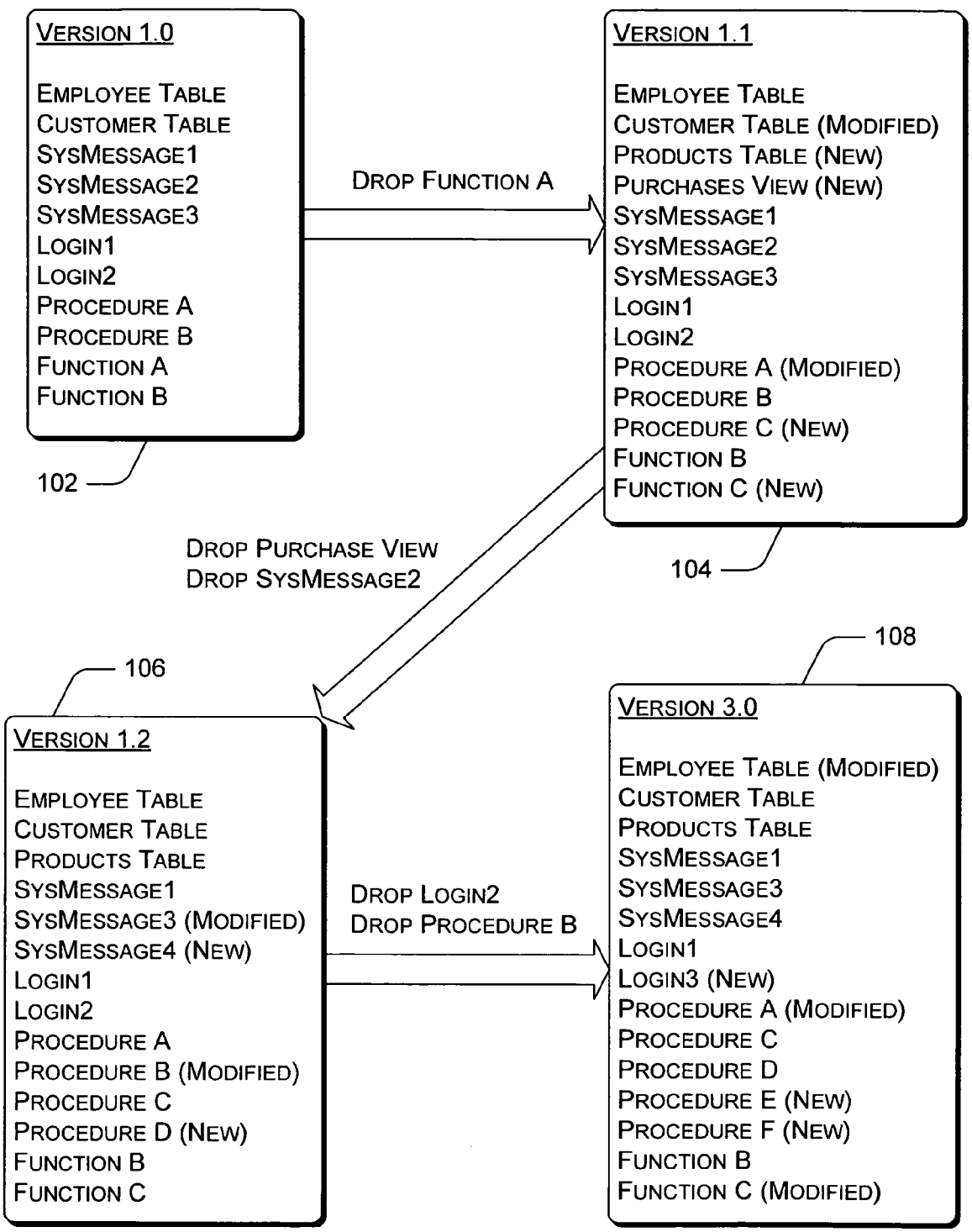
FIG. 1 is a block diagram that illustrates exemplary schemas associated with four sequential versions of a relational database.

FIG. 1 illustrates exemplary schema data associated with four sequential versions of a relational database. In the illustrated example, box 102 represents version 1.0, which is an initial release of a relational database. Version 1.0 of the database includes an employee table, a customer table, three system messages (i.e., SysMessage1, SysMessage2, and SysMessage3), two logins (i.e., login1 and login2), two procedures (i.e., procedures A and B), and two functions (i.e., functions A and B).

Box 104 represents a second version (i.e., version 1.1) of the same relational database. Changes that occurred between version 1.0 and version 1.1 include modifications to the customer table, creation of a products table, creation of a purchases view, modification of procedure A, creation of new procedure C, deletion of function A, and creation of new function C.

Box 106 represents a third version (i.e., version 1.2) of the same relational database. Changes that occurred between version 1.1 and version 1.2 include deletion of the purchases view, deletion of SysMessage2, modifications to SysMessage3, creation of SysMessage4, modifications to procedure B, and creation of procedure D.

Box 108 represents a fourth version (i.e., version 3.0) of the same relational database. Changes that occurred between version 1.2 and version 3.0 include modifications to the employee table, deletion of login2, creation of login3, modifications to procedure A, deletion of procedure B, creation of procedure E, creation of procedure F, and modifications to function C.

It is clear from the illustration in FIG. 1 that supporting users of multiple versions of the illustrated database can be very cumbersome as the users upgrade from one version to another. For example, when version 1.2 is released, new users will install version 1.2 of the database from scratch. In this scenario, an installation file for installing version 1.2 of the relational database accounts for database objects created in version 1.0, version 1.1, and version 1.2, as well as any modifications to objects performed when upgrading to version 1.1 or version 1.2, as well as any deletes performed when upgrading to version 1.1 or version 1.2 are included in.

Similarly, different upgrade files can be generated to upgrade existing users from version 1.1 to version 1.2 or to upgrade existing users from version 1.0 to version 1.2. That is, a file to upgrade an existing user from version 1.1 to version 1.2 accounts for changes to the database structure that occurred between version 1.1 and version 1.2. On the other hand, a script to upgrade an existing user from version 1.0 to version 1.2 accounts for changes to the database structure that occurred between versions 1.0 and 1.1 and changes to the database structure that occurred between versions 1.1 and 1.2.

Database Schema Version Management XML Schema Definition

FIG. 2 illustrates an XML schema definition (XSD) 202 that defines the structure of an exemplary XML file that may be used to maintain schema data associated with multiple sequential versions of a relational database. An XML file structured according to XSD 202 includes a single element 204 named "DSVM" (database schema version management) of type "DSVMType".

Type definition 206 specifies the structure of an element with type equal to "DSVMType". As specified by type definition 206, any element having type "DSVMType" is made up of a sequence of "Release" elements, each of type "ReleaseType". The sequence may have any number of "Release" elements (as indicated by the maxOccurs="unbounded" specification, but must have at least one "Release" element (as indicated by the minOccurs="1" specification).

Type definition 208 specifies the structure of an element with type equal to "ReleaseType". As specified by type definition 208, any element having type "ReleaseType" has a version attribute 210 and a sequence 212 of three elements, "ddl", "sproc", and "drop", each of type "SchemaDataType". The sequence 212 may include zero or more of each of the specified elements. In the described exemplary implementation, a ddl element is used to specify a file containing one or more scripts to create, modify, or delete data definition language (DDL) objects (e.g., tables, views, system messages, logins, etc.); a sproc element is used to specify a file containing a data manipulation language (DML) script (e.g., stored procedures, functions, etc.); and a drop element is used to specify a file containing a script to drop a data manipulation language (DML) object.

Type definition 214 specifies the structure of an element with type equal to "SchemaDataType" (i.e., ddl, sproc, and drop elements of a ReleaseType element).

Header 216 includes attributes that identify a namespace associated with the schema. The targetNamespace attribute makes it possible to reuse schema definitions and declarations between schemas. The header as illustrated is well-known to those skilled in the art.

XML-Based Management of Relational Database Schema Version Data

FIG. 3 illustrates an exemplary XML file 302 structured according to XSD 202 illustrated in FIG. 2. XML file 302 describes the schemas of relational database versions 102, 104, 106, and 108 as illustrated in FIG. 1. In the described exemplary implementation, XML file 302 is created and managed by an individual (e.g., the designer and/or developer of the relational database that is being represented). For each release of the relational database, a release element that includes a sequence of entries is added to XML file 302 to specify script files that, when executed, will upgrade the previous version of the database to the current version of the database. For example, if there are entries in an XML file that correspond to versions 1.0, 1.1, 1.2, and 3.0 of a relational database, then the entries associated with version 1.1 specify the changes between version 1.0 and version 1.1. Similarly, the entries associated with version 1.2 specify the changes between version 1.1 and version 1.2; and the entries associated with version 3.0 specify the changes between version 1.2 and 3.0.

In addition to being grouped by version, references to script files in XML file 302 are also presented in the order in which they are to be executed. For example, if two functions and a stored procedure are being added for a particular version, if the stored procedure references the two functions, then the two functions need to be created before the stored procedure is created. Accordingly, entries associated with the two functions are listed in the XML file before an entry associated with the stored procedure.

Release elements 304, 306, 308, and 310 correspond to versions 1.0, 1.1, 1.2, and 3.0, respectively, of the relational database, as illustrated in FIG. 1. The version attribute for each release element is assigned a sequential number that corresponds to the order in which the database versions were released. The value of the version attributes may correspond to the version number assigned to each release of the database, but, as illustrated in FIG. 3, the value of the version attribute associated with a particular release element does not necessarily correspond to the version number associated with the actual database release. Release element 304 has version attribute "1", corresponds to relational database version 1.0, and includes ddl elements and sproc elements. Because version 1.0 is an initial release of the relational database, no elements need to be dropped from a previous version, so there are no drop elements specified. The first ddl element specifies a file named "Tables1.0.sql" that includes DDL scripts to create, for example, the Employee Table and the Customer Table. The second ddl element specifies a file named "SysMessages1.0.sql" that includes DDL scripts to create SysMessage1, SysMessage2, and SysMessage3. The third ddl element specifies a file named "Login1.0.sql" that includes DDL scripts to create Login1 and Login2.

The first sproc element specifies a file named "ProcA.sql" that includes a DML script associated with procedure A. The second sproc element specifies a file named "FuncA.sql" that includes a DML script associated with function A. The third sproc element specifies a file named "ProcB.sql" that includes a DML script associated with procedure B. The fourth sproc element specifies a file named "FuncB.sql" that includes a DML script associated with function B. In the described exemplary implementation, the scripts in the specified DML files do not include the key word that defines the operation to be performed, such as "create" or "alter". These key words are prepended to scripts as needed, as will be described in further detail below.

Release element 306 corresponds to version 1.1 of the relational database and includes elements that represent changes to the database between version 1.0 and version 1.1. Release element 306 includes a ddl element, three sproc elements, and a drop element. The ddl element specifies a file named "UpgradeTables1.1.sql" that includes ddl scripts to modify the customer table, create a products table, and create a purchases view (i.e., the DDL changes between version 1.0 and version 1.1). The sproc elements specify files named "ProcA.sql", "ProcC.sql", and "FuncC.sql". The file named "ProcA.sql" contains a script associated with procedure A, which is to be modified; the file named "ProcC.sql" contains a script associated with procedure C, which is to be created; and the file "FuncC.sql" contains a script associated with function C, which is to be created. The drop element specifies a file named "FuncA.sql" that contains a script. When executed, the script causes function A, which exists in version 1.0, to be dropped.

Similarly, release element 308 corresponds to version 1.2 of the relational database and includes elements that represent changes to the database between version 1.1 and version 1.2. Release element 308 includes a ddl element and two sproc elements. The ddl element specifies a file named "UpgradeSysMessages1.2.sql" that includes ddl scripts that, when executed, cause existing purchase view and SysMessage2 to be dropped, existing SysMessage3 to be modified, and new SysMessage4 to be created. The two sproc elements specify files named "ProcB.sql" and "ProcD.sql". Release element 308 does not include a drop element, indicating that there are no DML objects that were dropped between version 1.1 and version 1.2.

Finally, release element 310 corresponds to version 3.0 of the relational database and includes elements that represent changes to the database between version 1.2 and version 3.0. Release element 310 includes two ddl elements, four sproc elements, and one drop element. The ddl elements specify files named "UpgradeTables3.0.sql" and "UpgradeLogins3.0.sql" that include ddl scripts that, when executed, cause the employee table to be modified, existing login2 to be dropped, and new login3 to be created. The sproc elements specify files named "ProcA.sql", "FuncC.sql", "ProcE.sql", and "ProcF.sql". As illustrated in FIG. 1, procedure A and function C are modified, and procedure E and procedure F are added when moving from version 1.2 to version 3.0. The drop element specifies a file named "ProcB.sql" that contains a script that, when executed, causes procedure B to be dropped.

Installation File Generation for Initial Database Version

Figure 4:
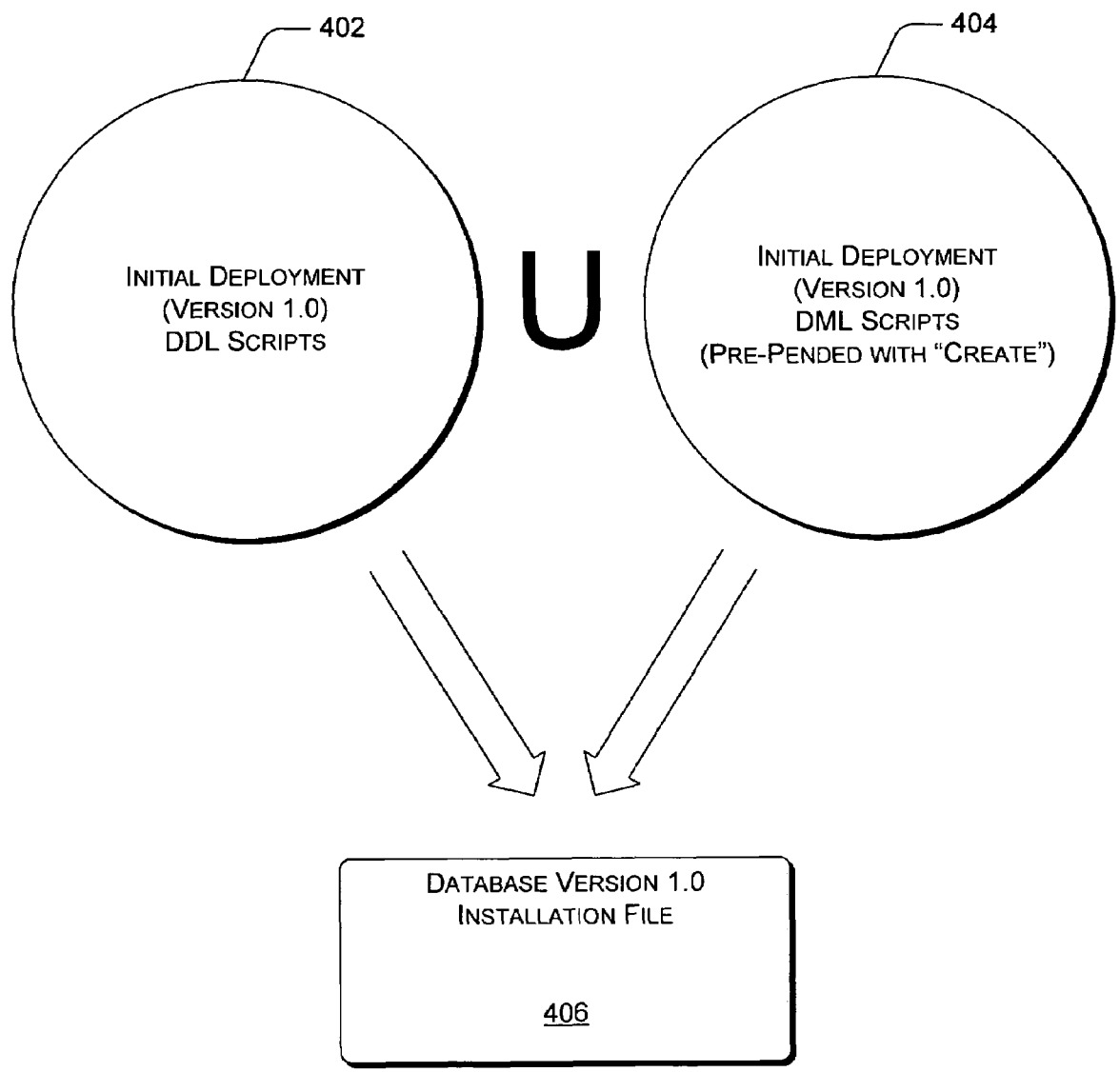
FIG. 4 is a block diagram that illustrates in set theory notation, an exemplary method for generating an installation file for creating an initial version of a relational database.

FIG. 4 illustrates in set theory notation, an exemplary method for generating an installation file for an initial version of a relational database. Set 402 includes DDL scripts for creating DDL objects associated with the initial version of the relational database. For version 1.0 of the example relational database represented in FIGS. 1 and 3, set 402 includes the scripts in files "Tables1.0.sql", "SysMessages1.0.sql", and "Login1.0.sql".

Set 404 includes DML scripts (prepended with a "create" command) for creating DML objects associated with the initial version of the relational database. For version 1.0 of the example relational database represented in FIGS. 1 and 3, set 404 includes the scripts in files "ProcA.sql", "FuncA.sql", "ProcB.sql", and "FuncB.sql" (each prepended with a "create" command").

As indicated in FIG. 4, the union of set 402 and set 404 results in a version 1.0 installation file 406 for the relational database.

Installation File Generation for a Non-Initial Database Version

Figure 5A:
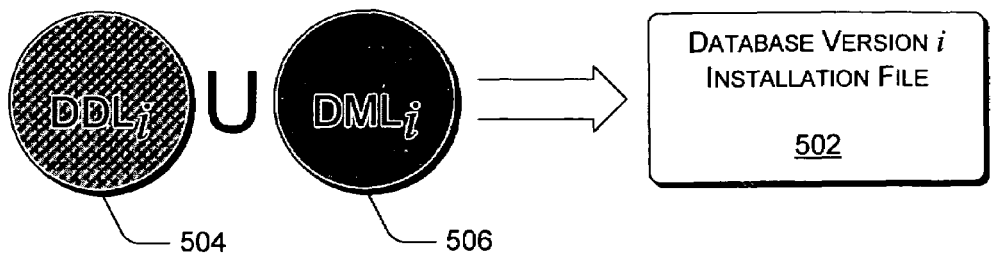
FIG. 5a is a block diagram that illustrates in set theory notation, an exemplary method for generating an installation file for creating a full install of a non-initial version of a relational database.

FIG. 5a illustrates in set theory notation, an exemplary method for generating an installation file for a non-initial version of a relational database. For example, if there have been versions 1.0, 1.1, and 1.2 of a relational database, FIG. 5 illustrates a method for generating an installation file for a new user that, when executed, will fully install all of the database elements that exist in version 1.2, without requiring the user to first install version 1.0, upgrade to version 1.1, and finally upgrade to version 1.2.

Installation file 502 for a non-initial version (version i) of a relational database contains the union of sets 504 and 506. Set 504 includes DDL scripts from version i and previous versions of the database. For example, given the example relational database represented in FIGS. 1 and 3, for creation of version 1.1, set 504 includes the DDL scripts from versions 1.0 and 1.1; for creation of version 1.2, set 504 includes the DDL scripts from versions 1.0, 1.1, and 1.2.

Set 506 includes DML scripts from version i and previous versions of the database, not including scripts for those DML objects that are dropped and not re-created between the initial version and version i of the relational database. For example, given the example relational database represented in FIGS. 1 and 3, for creation of version 1.1, set 506 includes the DML scripts contained in files "Tables1.0.sql", "SysMessages1.0.sql", "Login1.0.sql", "UpgradeTables1.1.sql", "ProcA.sql", "ProcB.sql", "FuncB.sql", "ProcC.sql", "FuncC.sql", but does not include scripts contained in the file "FuncA.sql" because "FuncA.sql" is specified as a drop element associated with version 1.1.

Figure 5B:
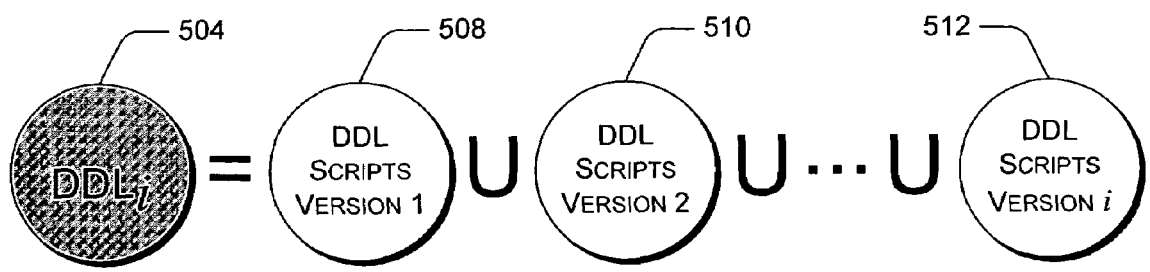
FIG. 5b is a block diagram that illustrates in set theory notation, an exemplary method for determining a set of data definition language scripts to be included in a relational database installation file.

FIG. 5b illustrates in set theory notation, an exemplary method for determining set 504. Set 504 is equal to the union of sets of DDL scripts for each version of the database, up to and including version i. That is, the union of sets 508, 510, ..., 512, where set 508 includes DDL scripts associated with the first version, set 510 includes DDL scripts associated with the second version, and so on, up to set 512, which includes DDL scripts associated with the $i^{th}$ version of the relational database.

Figure 5C:
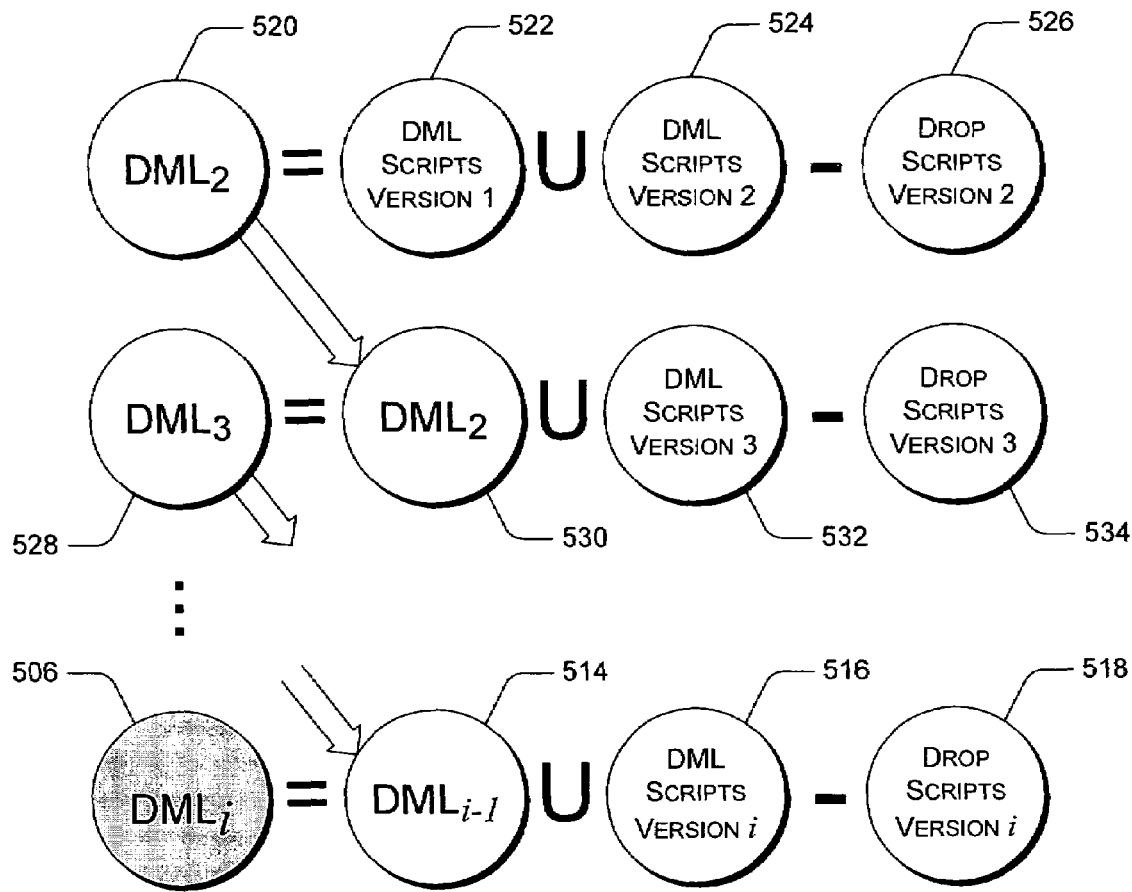
FIG. 5c is a block diagram that illustrates in set theory notation, an exemplary method for determining a set of data manipulation language scripts to be included in a relational database installation file.

FIG. 5c illustrates in set theory notation, an exemplary method for determining set 506. Set 506 includes those scripts found in the union of sets 514 and 516 that are not also found in set 518, where set 514 includes DML scripts associated with version i−1, set 516 includes DML scripts associated with an upgrade from version i−1 to version i, and set 518 includes drop scripts associated with an upgrade from version i−1 to version i. As illustrated in FIG. 5c, the process of generating set 506 is iterative. First, set 520 is generated to include DML scripts associated with a full install of the second version of a relational database. Set 520 includes DML scripts associated with the first version (set 522) and DML scripts associated with the second version (set 524), except for any scripts associated with DML objects that get dropped (set 526) when upgrading from the first version to the second version. Similarly, set 528 is generated, which includes DML scripts associated with a full install of the third version, and is mathematically expressed in FIG. 5c as set 528 equal to set 530 union set 532 minus set 534. This process is continued as indicated in FIG. 5c until set 506 is determined.

Database Upgrade File Generation

Figure 6A:
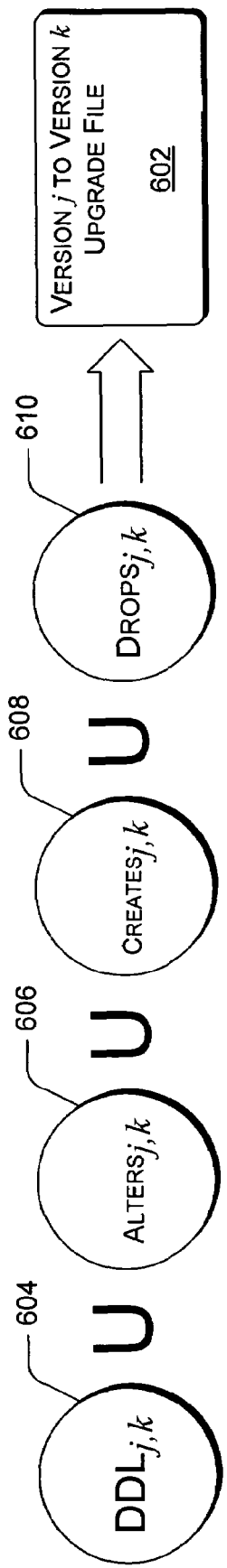
FIG. 6a is a block diagram that illustrates in set theory notation, an exemplary method for generating an upgrade file for upgrading a relational database from one version to a newer version.

FIG. 6a illustrates in set theory notation, an exemplary method for generating an upgrade file for upgrading from one version to another version of a relational database. For example, if there have been versions 1.0, 1.1, and 1.2 of a relational database, FIG. 6a illustrates a method for generating an upgrade file that, when executed, will upgrade an existing version 1.0 instance of the relational database to version 1.2 of the relational database, without requiring the user to first upgrade to version 1.1 and then upgrade to version 1.2.

Upgrade file 602 for upgrading from version j to version k of a relational database includes scripts represented by sets 604, 606, 608, and 610 (shown with the union symbol between them in FIG. 6a). Set 604 includes the DDL scripts for upgrading from version j to version k. Set 606 includes DML scripts associated with DML objects that exist in version j and get modified between version j and version k. Set 608 includes DML scripts associated with DML objects that exist in version k, but that don't exist in version j. Set 610 includes drop scripts associated with DML objects that exist in version j, but that don't exist in version k.

Figure 6B:
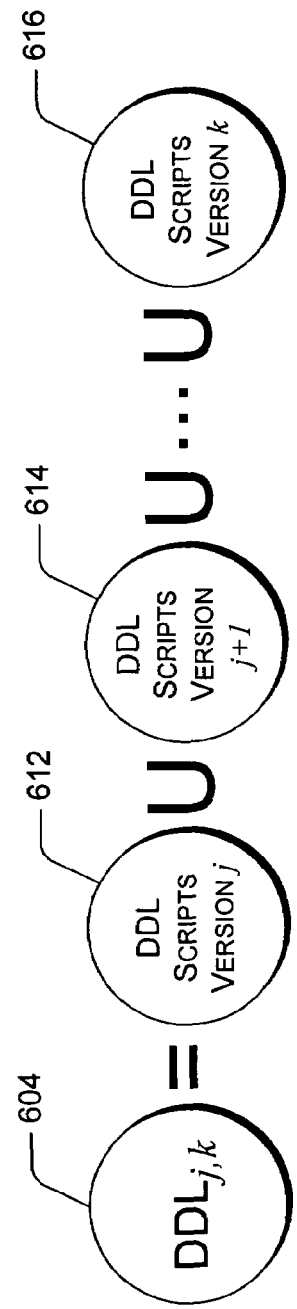
FIG. 6b is a block diagram that illustrates in set theory notation, an exemplary method for generating a set of data definition language scripts associated with a relational database upgrade file.

FIG. 6b illustrates in set theory notation, an exemplary method for determining set 604. Set 604 is the union of sets 612, 614, ..., 616, where set 612 represents DDL scripts for upgrading from version j to version j+1; set 614 represents DDL scripts for upgrading from version j+1 to version j+2; and so on up to set 616, which represents DDL scripts for upgrading from version k−1 to version k.

Figure 6C:
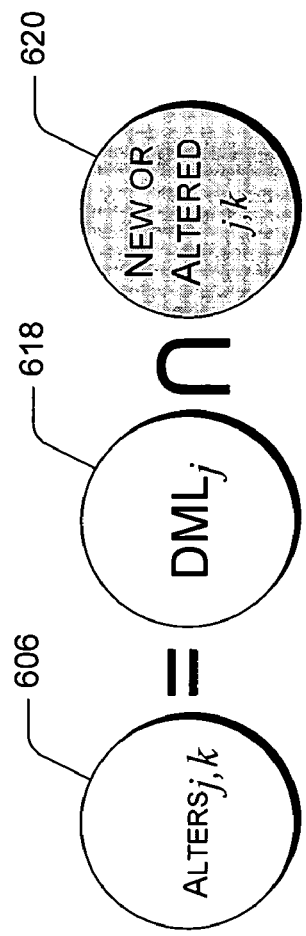
FIG. 6c is a block diagram that illustrates in set theory notation, an exemplary method for generating a set of data manipulation language scripts associated with a relational database upgrade file for modifying data manipulation language objects.

FIG. 6c illustrates in set theory notation, an exemplary method for determining set 606. Set 606 includes DML scripts that alter DML objects that are modified between version j and version k of a relational database. Set 606 is illustrated in FIG. 6 as being the intersection of sets 618 and 620, where set 618 is a set of scripts for DML objects that exist in version j and set 620 is a set of scripts for DML objects that are created or modified between version j and version k of a relational database. Determining set 618 is described above with reference to determining set 506 as illustrated in FIG. 5c. Determination of set 620 is described in further detail below with reference to FIG. 7.

Figure 6D:
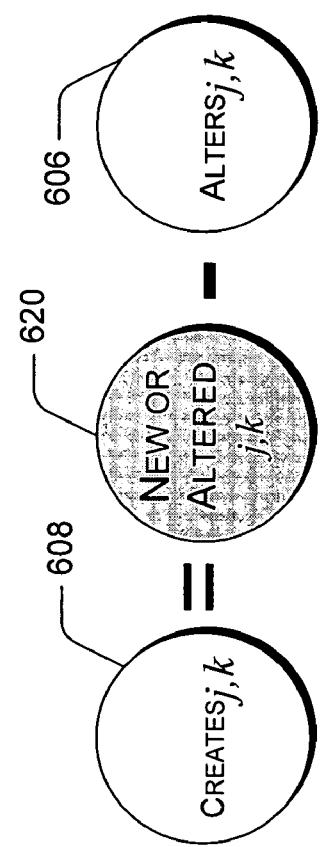
FIG. 6d is a block diagram that illustrates in set theory notation, an exemplary method for generating a set of data manipulation language scripts associated with a relational database upgrade file for creating data manipulation language objects.

FIG. 6d illustrates in set theory notation, an exemplary method for determining set 608. Set 608 includes DML scripts associated with new DML objects that are created between version j and version k of a relational database. Set 608 is illustrated in FIG. 6d as being the difference between sets 620 and 606, where set 620, as described above, is a set of scripts for DML objects that are created or modified between version j and version k; and set 606, as described above, is a set of scripts that modify DML objects that exist in version j and get modified between version j and version k.

Figure 6E:
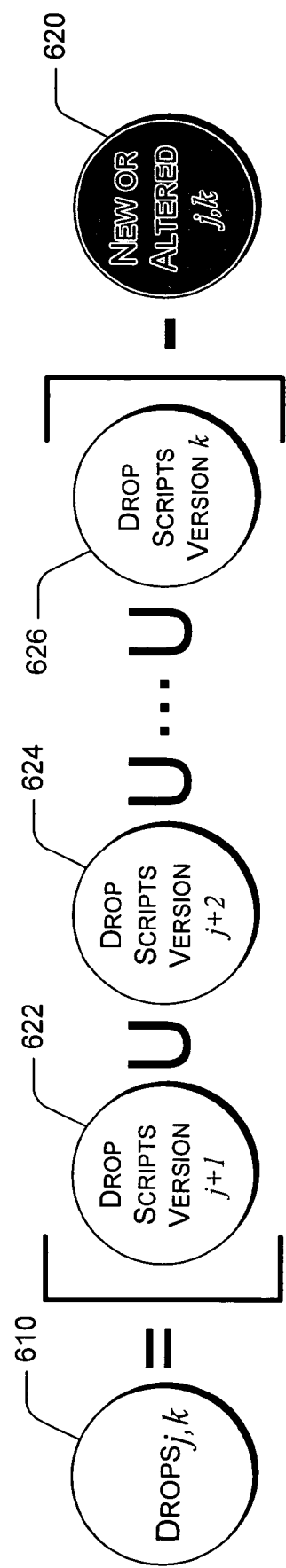
FIG. 6e is a block diagram that illustrates in set theory notation, an exemplary method for generating a set of data manipulation language scripts associated with a relational database upgrade file for dropping data manipulation language objects.

FIG. 6e illustrates in set theory notation, an exemplary method for determining set 610. Set 610 includes drop scripts for DML objects that are dropped and not re-created between version j and version k. Set 610 is illustrated in FIG. 6e as being the difference between (A) the union of sets 622, 624, ..., 626 and (B) set 620, where sets 622, 624, ..., 626 represent drop scripts associated with versions j+1, j+2, ..., k, respectively; and where set 620, as described above, is a set of scripts for DML objects that are created or modified between version j and version k.

Figure 7:
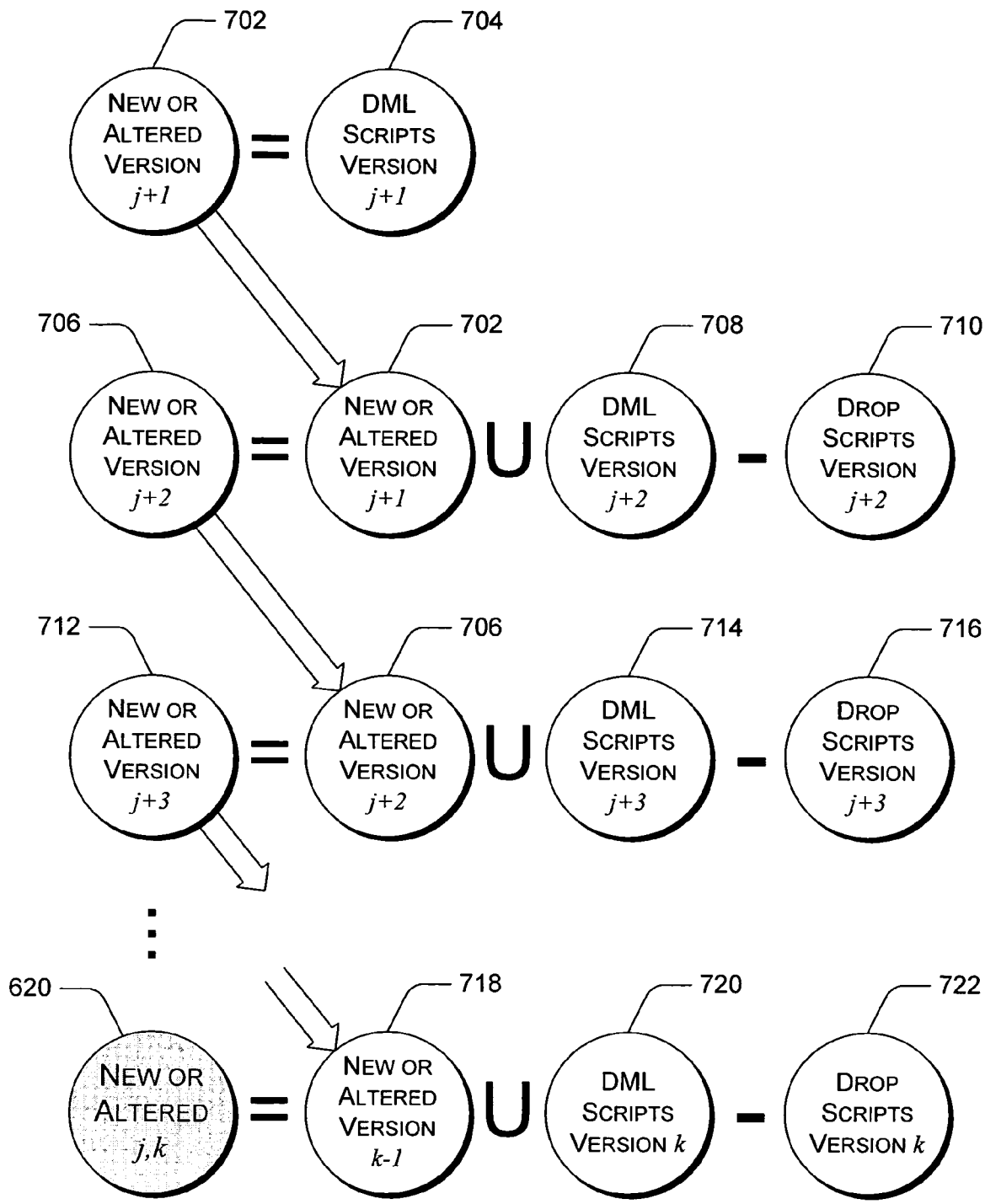
FIG. 7 is a block diagram that illustrates in set theory notation, an exemplary method for generating a set of data manipulation language scripts associated with data manipulation language objects that are created or modified in an upgrade of a relational database.

FIG. 7 illustrates in set theory notation, an exemplary method for determining set 620, which is a set of scripts for DML objects that are created or modified between version j and version k of a relational database. Determination of set 620 is an iterative process, and is very similar to the process described above for determining set 506, as illustrated in FIG. 5c. First, set 702 is determined as a set of DML scripts that create or modify DML objects between version j and version j+1. These are represented as set 704, which includes scripts that are specified as sproc elements associated with version j+1 in a database schema version management (DSVM) XML file associated with the relational database, such as XML file 302 shown in FIG. 3.

Next, set 706 is determined as a set of DML scripts that create or modify DML objects between version j and version j+2. As illustrated in FIG. 7, set 706 includes those elements found in the union of sets 702 and 708 that are not also found in set 710, where set 702, as described above, is a set of DML scripts that create or modify DML objects between version j and version j+1; set 708 is a set of DML scripts that create or modify DML objects between version j+1 and version j+2; and set 710 is a set of drop scripts associated with DML objects that are dropped between version j+1 and version j+2. The drop scripts of set 710 are specified as drop elements associated with version j+2 in a DSVM XML file associated with a relational database.

Similarly, set 712 is a set of DML scripts that create or modify DML objects between version j and version j+3. As illustrated in FIG. 7, set 712 includes those elements found in the union of sets 706 and 714 that are not also found in set 716, where set 706, as described above, is a set of DML scripts that create or modify DML objects between version j and version j+2; set 714 is a set of DML scripts that create or modify DML objects between version j+2 and version j+3; and set 716 is a set of drop scripts associated with DML objects that are dropped between version j+2 and version j+3.

This process continues until, finally, set 620 is generated so as to include those elements found in the union of sets 718 and 720 that are not also found in set 722, where set 718 is a set of DML scripts that create or modify DML objects between version j and version k−1; set 720 is a set of DML scripts that create or modify DML objects between version k−1 and version k; and set 722 is a set of drop scripts associated with DML objects that are dropped between version k−1 and version k.

Database Schema Version Management System

Figure 8:
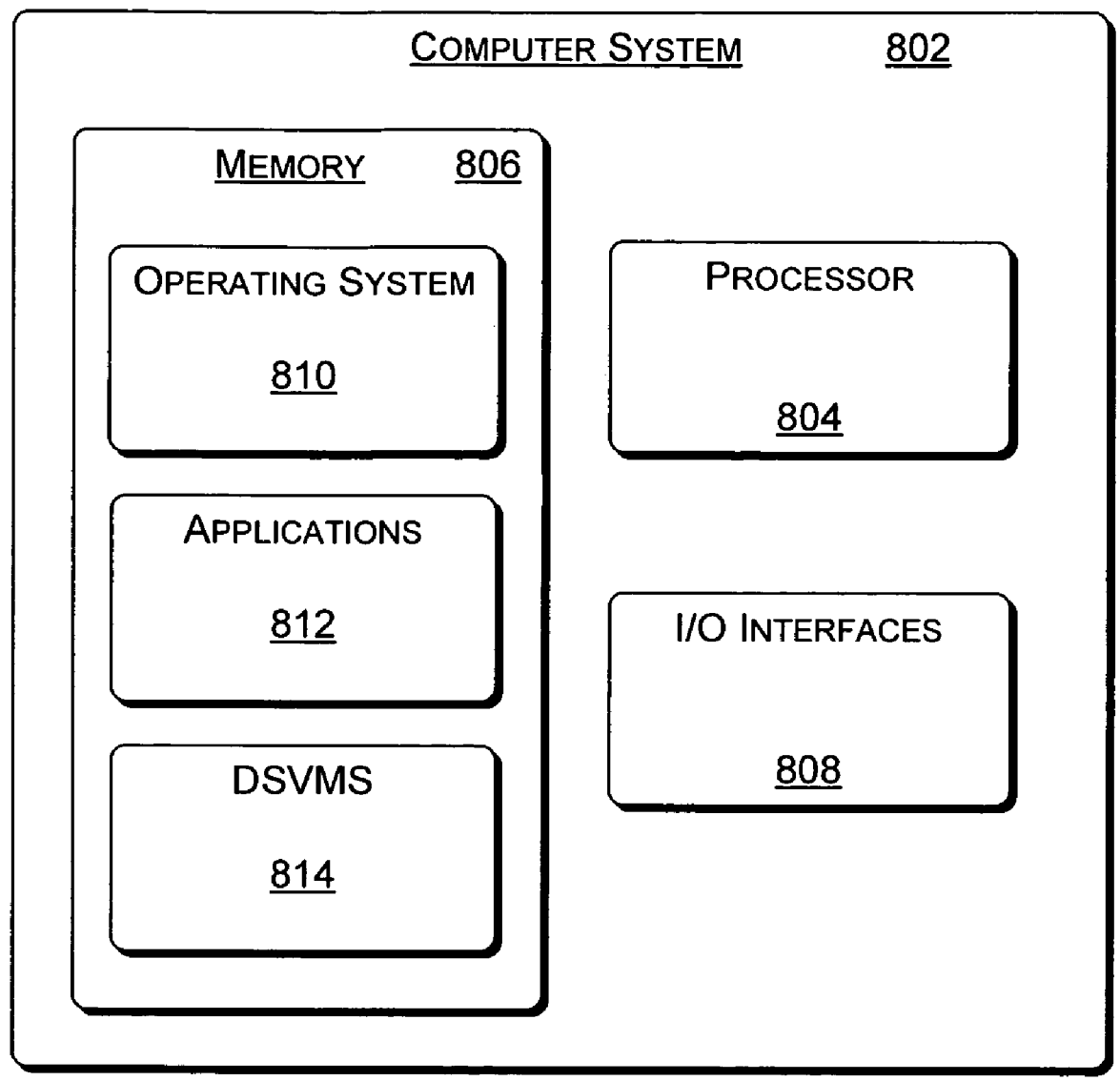
FIG. 8 is a block diagram that illustrates select components of an exemplary computer system in which a database schema version management system may be implemented.

FIG. 8 illustrates select components of an exemplary computer system 802 in which a database schema version management system as described herein may be implemented. Computer system 802 includes a processor 804, a memory 806, and input/output interfaces 808. Input/output interfaces 808 provide a means by which computer system 802 can communicate with other devices, including, but not limited to, other computers, a keyboard, a mouse, and a display device. Operating system 810 is stored in memory 806 and executed on processor 804 to provide a software platform on which applications 812 may run. Applications 812 are also stored in memory 806 and executed on processor 804. Examples of applications 812 may include, but are not limited to, word processing applications, spreadsheet applications, user interface development applications, database development applications, and so on.

Database schema version management system (DSVMS) 814 is a specific application that is stored in memory 806 and executed on processor 804. DSVMS 814 maintains metadata associated with the schemas of multiple versions of a relational database and uses the schema metadata to generate installation or upgrade files for versions of the database.

Figure 9:
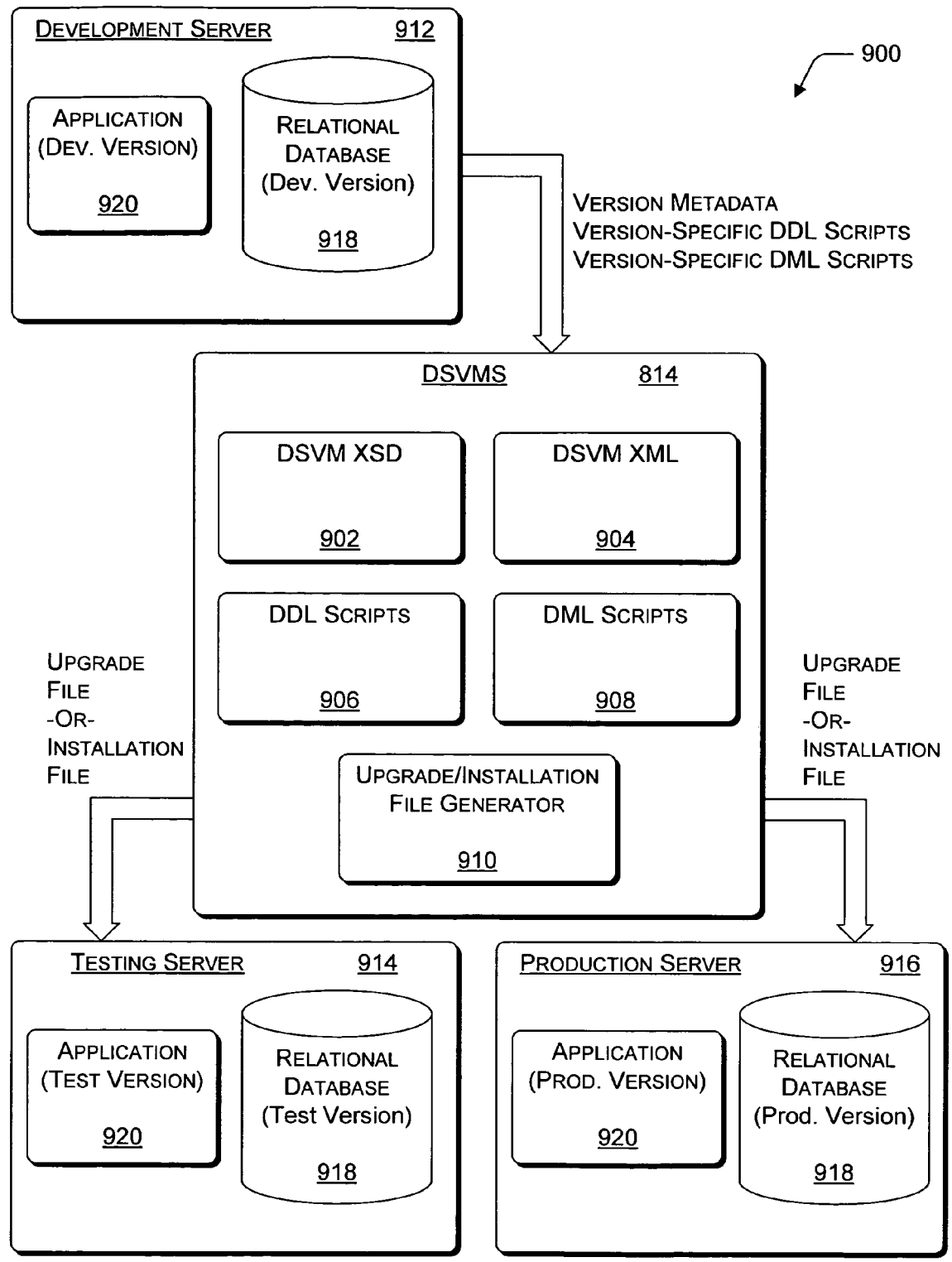
FIG. 9 is a block diagram that illustrates an exemplary environment in which a database schema version management system (DSVMS) may be implemented.

FIG. 9 illustrates select components of an exemplary DSVMS 814, illustrated within an exemplary software development environment 900. DSVMS 814 includes database schema version management XML schema definition (DSVM XSD) 902, DSVM XML file 904, data definition language (DDL) scripts 906, data manipulation language (DML) scripts 908, and upgrade/installation file generator 910.

XSD 902 is an XML schema definition that defines a structure for XML file 904. An example DSVM XSD is described above with reference to FIG. 2. XML file 904 is structured according to DSVM XSD 902, and maintains metadata associated with the schemas of one or more sequential versions of a relational database. An example DSVM XML file is described above with reference to FIG. 3.

DDL scripts 906 are scripts that can be run to create, modify, or drop DDL objects (e.g., tables, views, logins, system messages, etc.) of a relational database. DML scripts 908 are scripts that can be run to create, modify, or drop DML objects (e.g., stored procedures, functions, etc.) of a relational database.

Upgrade/installation file generator 910 is configured to assemble a file of scripts that, when executed, will install a particular version of a relational database, or upgrade an existing installation of the database from one version to another. In an exemplary implementation, upgrade/installation file generator 910 applies laws of set theory (e.g., as described above with reference to FIGS. 4-7) to database schema metadata stored in DSVM XML file 904. The results of the set theory calculations are then used to identify specific DDL scripts 906 and DML scripts 908 that are to be included in a particular upgrade or installation file. In an exemplary implementation, upgrade/installation file generator 910 is implemented using the C# programming language. However, it is recognized that any number of programming languages may be used to implement upgrade/installation file generator 910 including, but not limited to, the C, programming language, the C++ programming language, or the JAVA Programming language.

Environment 900 is an exemplary database application development environment in which an exemplary DSVMS 814 may be implemented. Environment 900 includes a development server 912, and may also include a testing server 914 and a production server 916. Development server 912 includes a development version of relational database 918, and may also include a development version of an application 920, which is configured, for example, to access the development version of database 918. Testing server 914 includes a testing version of relational database 918 and a testing version of application 920, which is configured, for example, to access the testing version of database 918. Similarly, production server 916 includes a production version of relational database 918 and a production version of application 920.

In an exemplary implementation, development server 912 is used by software developers to create upgrades to relational database 918 and application 920. Testing server 914 is configured to mimic a production environment to enable thorough testing of a new version of relational database 918 and application 920, before the new version is ported to production server 916, where it is available for real-world operation.

DSVMS 814 may be installed on development server 912 or may be installed on a separate computer system not illustrated in FIG. 9. Alternatively, different portions of DSVMS 814 may reside on different physical computer systems. For example, upgrade/installation file generator 910 may reside on a separate computer system (not illustrated in FIG. 9) while DSVM XSD 902, DSVM XML 904, DDL scripts 906, and DML scripts 908 may reside on development server 912.

In an exemplary implementation, after the release of a particular version, development server 912, testing server 914, and production server 916 all house the same version of application 920 and relational database 918. When development of a new version begins, the version housed on testing server 914 and production server 916 does not change, but a new version being developed is housed on development server 912. As a new database version is developed, version-specific DDL and DML scripts are developed and/or version-specific modifications are made to existing DDL and DML scripts. Furthermore, version-specific database schema metadata is stored in DSVM XML to record a description of changes that are made from the previous version to the new version.

After database development is complete for the new version, upgrade/installation file generator 910 is invoked to generate an upgrade file to upgrade the test version of relational database 918 stored on testing server 914 to the new version of the database, which corresponds to the new version stored on development server 912.

Similarly, after testing is complete, upgrade/installation file generator 910 may be invoked to generate an upgrade file (or an installation file for new users) to upgrade relational database 918 stored on production server 916 to the new version.

Initial Version Database Installation Method

Figure 10:
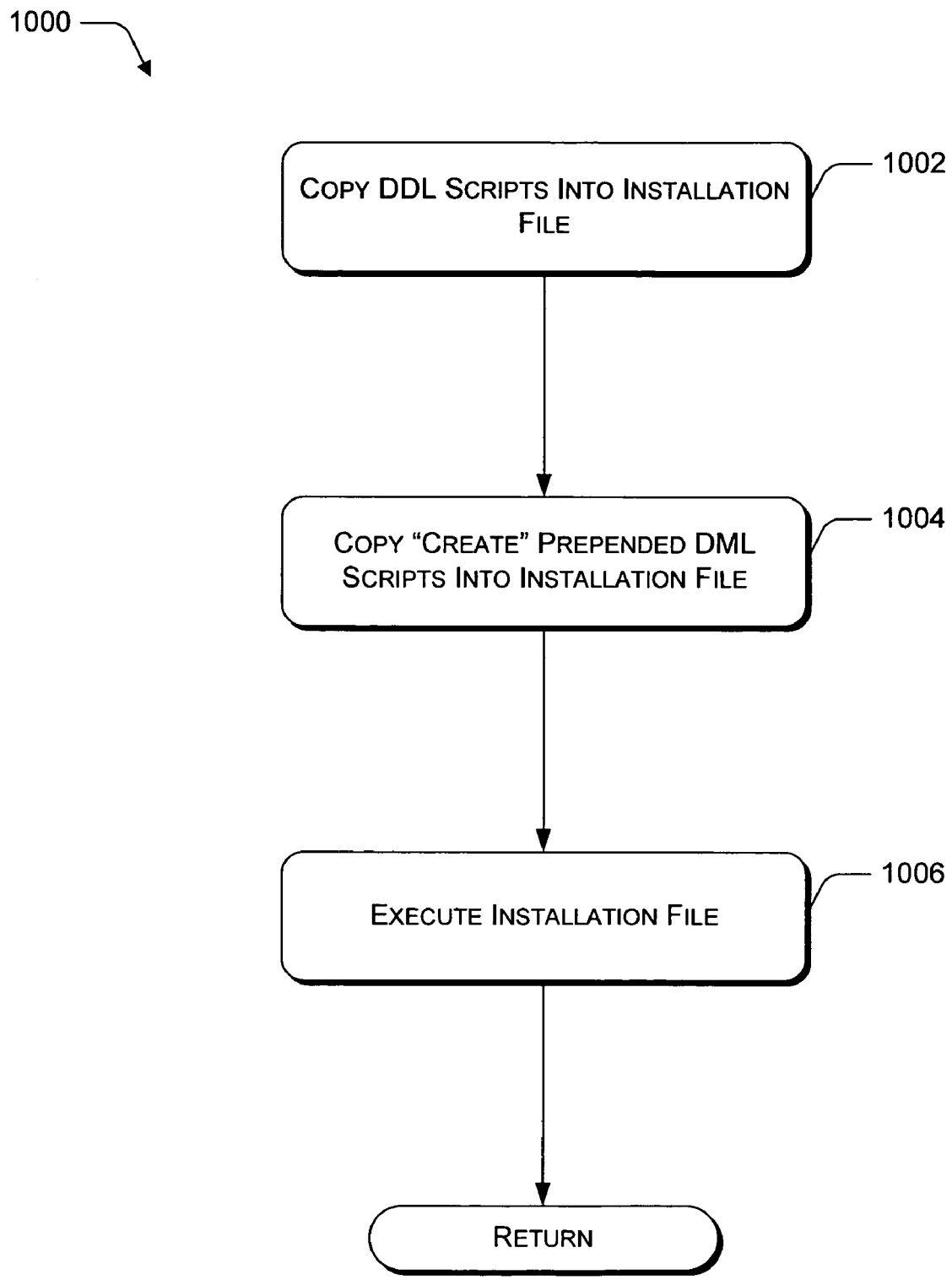
FIG. 10 is a flow diagram that illustrates an exemplary method for installing an initial version of a relational database.

FIG. 10 is a flow diagram that illustrates an exemplary method 1000 for installing an initial version of a relational database. The illustrated process can be implemented in any suitable hardware, software, firmware or combination thereof.

At block 1002, the system copies scripts associated with data definition language (DDL) objects of the initial version of the database into an installation file. For example, upgrade/installation file generator 910 examines data in XML file 904 to identify files containing DDL scripts associated with the first version of the database. In the described exemplary implementation, the DDL script files are identified by the ddl elements associated with the first release element in the XML file. The contents of the identified files are then copied into an installation file.

At block 1004, the system prepends a "create" command to data manipulation language (DML) scripts associated with the initial version of the database, and copies the scripts into the installation file. For example, upgrade/installation file generator 910 examines data in XML file 904 to identify files containing DML scripts associated with the first version of the database. In the described exemplary implementation, the DML script files are identified by the sproc elements associated with the first release element in the XML file. In an exemplary implementation, the DML script files do not include a keyword operator ("create", "alter", "drop", etc.), so a "create" command is prepended to the scripts as they are copied into the installation file.

The installation file that is generated contains scripts to create DDL and DML objects associated with the initial version of the database, and running the installation file will cause a new instance of the initial version of the database to be created. Blocks 1002 and 1004 of method 1000 are also illustrated in set theory notation in FIG. 4, and described with reference thereto above.

In the described implementation, there is a DML script file for each DML object associated with the database. If a particular function or stored procedure, for example, changes from version 1.0 to version 1.1, the script file is changed. Therefore, there is no way to recreate version 1.0 after version 1.1 has been released.

In an alternate implementation, however, DML scripts may be stored in different subdirectories, each corresponding to a different release of the database. In this way, a DML script for creating a particular function may be stored in a subdirectory associated with the first version of the database. When modifications are made to the function to support a later release, the script file for the function may be copied to the subdirectory associated with the later release, and modified. In this way, the script containing the original version of the function is available if a user wanted to install the earlier version of the database, but the modified script is also available to support the newer version of the database.

In an alternate implementation, rather than organizing the scripts by subdirectory, the scripts may be managed using a source version control system (e.g., CLEARCASE, SOURCE SAFE, CVS, etc.). The source version control system may maintain multiple versions of a single script file, as the file is modified through multiple versions of the relational database. In this implementation, the XML file in which the database schema data is stored may also include a version number associated with each script file such that the version number corresponds to a version number maintained by the source version control system. This type of an implementation enables the creation of an installation file for any version of the relational database (current or previous), as well as the creation of an upgrade file from any previous version to any newer version.

At block 1006, the installation file is executed. For example, to install the initial version of the database on testing server 914, the installation file generated by upgrade/installation file generator 910 is copied to testing server 914. The scripts in the installation file are then executed to create an instance of the initial version of the database. In an exemplary implementation, the scripts in the installation file are executed as a single transaction that can be committed or rolled back in its entirety. This prevents a partial install in an event that one of the DDL or DML scripts contains an error.

Non-Initial Version Database Installation Method

Figure 11:
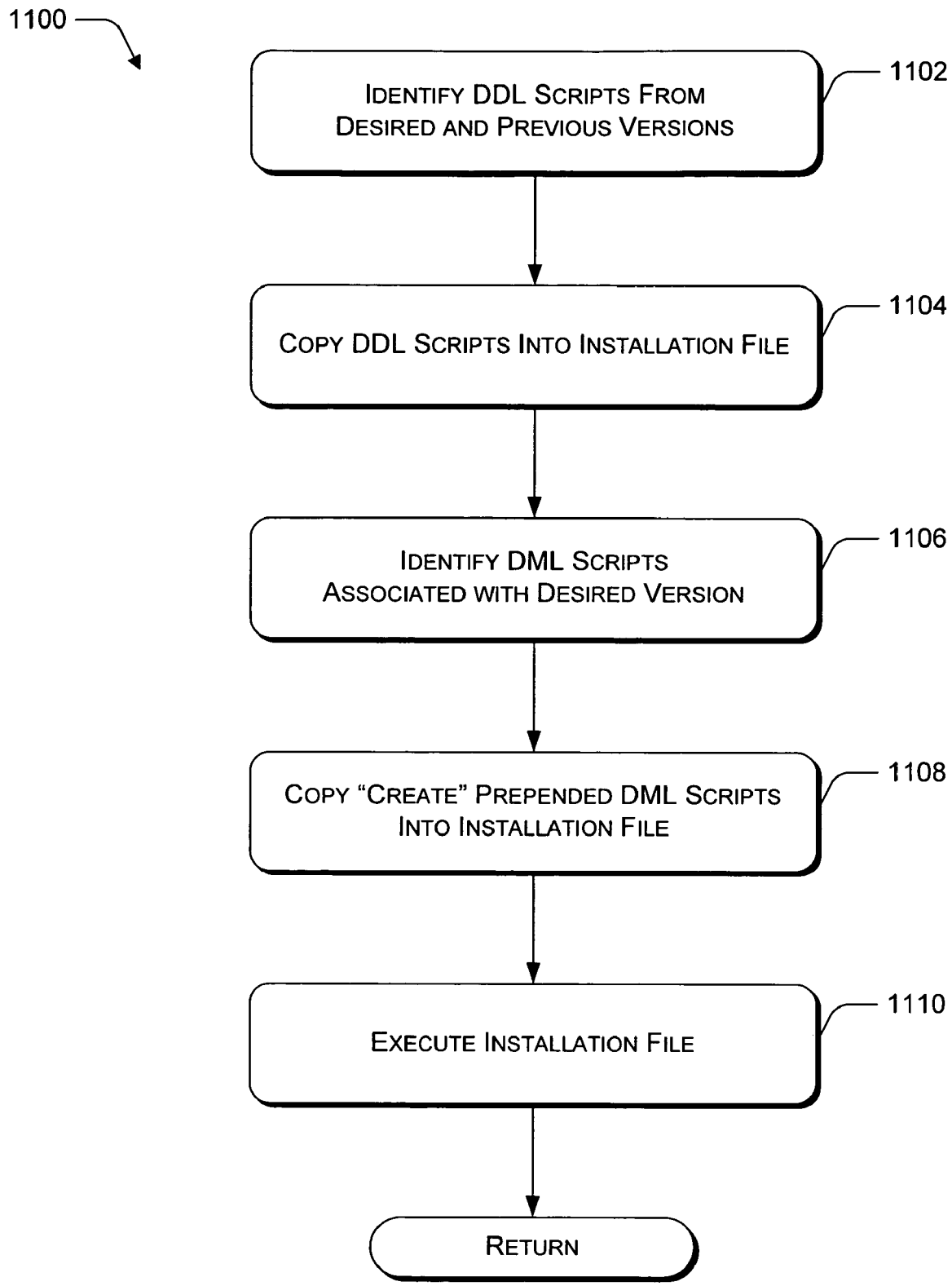
FIG. 11 is a flow diagram that illustrates an exemplary method for installing a non-initial version of a relational database.

FIG. 11 is a flow diagram that illustrates an exemplary method 1100 for installing a non-initial version of a relational database. The illustrated process can be implemented in any suitable hardware, software, firmware or combination thereof.

At block 1102, the system identifies scripts associated with data definition language (DDL) objects that have been part of the database version to be installed or any previous version of the database. For example, upgrade/installation file generator 910 examines data in XML file 904 to identify files containing DDL scripts associated with the first version of the database, the second version of the database, the third version of the database, and so on up to the version of the database to be installed. An exemplary method for identifying the DDL scripts to be added to the installation file is illustrated in FIG. 5b, and described above with reference to determination of set 504.

At block 1104, the system copies the DDL scripts that are identified into an installation file. For example, upgrade/installation file generator 910 extracts scripts from files indicated by the ddl elements identified in XML file 904, and copies the extracted scripts to an installation file.

At block 1106, the system identifies DML scripts associated with any version up to and including the version to be installed, not including DML scripts for DML elements that have been dropped and not re-created between the first version and the version to be installed. For example, upgrade/installation file generator 910 iteratively steps through the data stored in XML file 904 by release, adding to a set DML scripts specified by sproc elements and removing from the set DML scripts specified by drop elements. An exemplary method for identify the DML scripts to be added to the installation file is illustrated in FIG. 5c, and described above with reference to determination of set 506.

At block 1108, the system prepends a "create" command to the identified data manipulation language (DML) scripts, and copies the scripts into the installation file.

The installation file that is generated contains scripts to create the DDL and DML objects associated with the non-initial version of the database, and running the installation file will cause a new instance of the non-initial version of the database to be installed.

As described above, to support creation of an installation file associated with any version of the relational database, previous or current, script files may be organized in subdirectories that correspond to different versions of the database. Alternatively, a source version control system may be implemented to manage multiple versions of one or more script files.

At block 1110, the installation file is executed. For example, to install a non-initial version of the database on a production server 914, the installation file generated by upgrade/installation file generator 910 is copied to production server 916. The scripts in the installation file are then executed to create an instance of the non-initial version of the database. In an exemplary implementation, the scripts in the installation file are executed as a single transaction that can be committed or rolled back in its entirety. This prevents a partial install in an event that one of the DDL or DML scripts contains an error.

Database Upgrade File Creation Method

Figure 12:
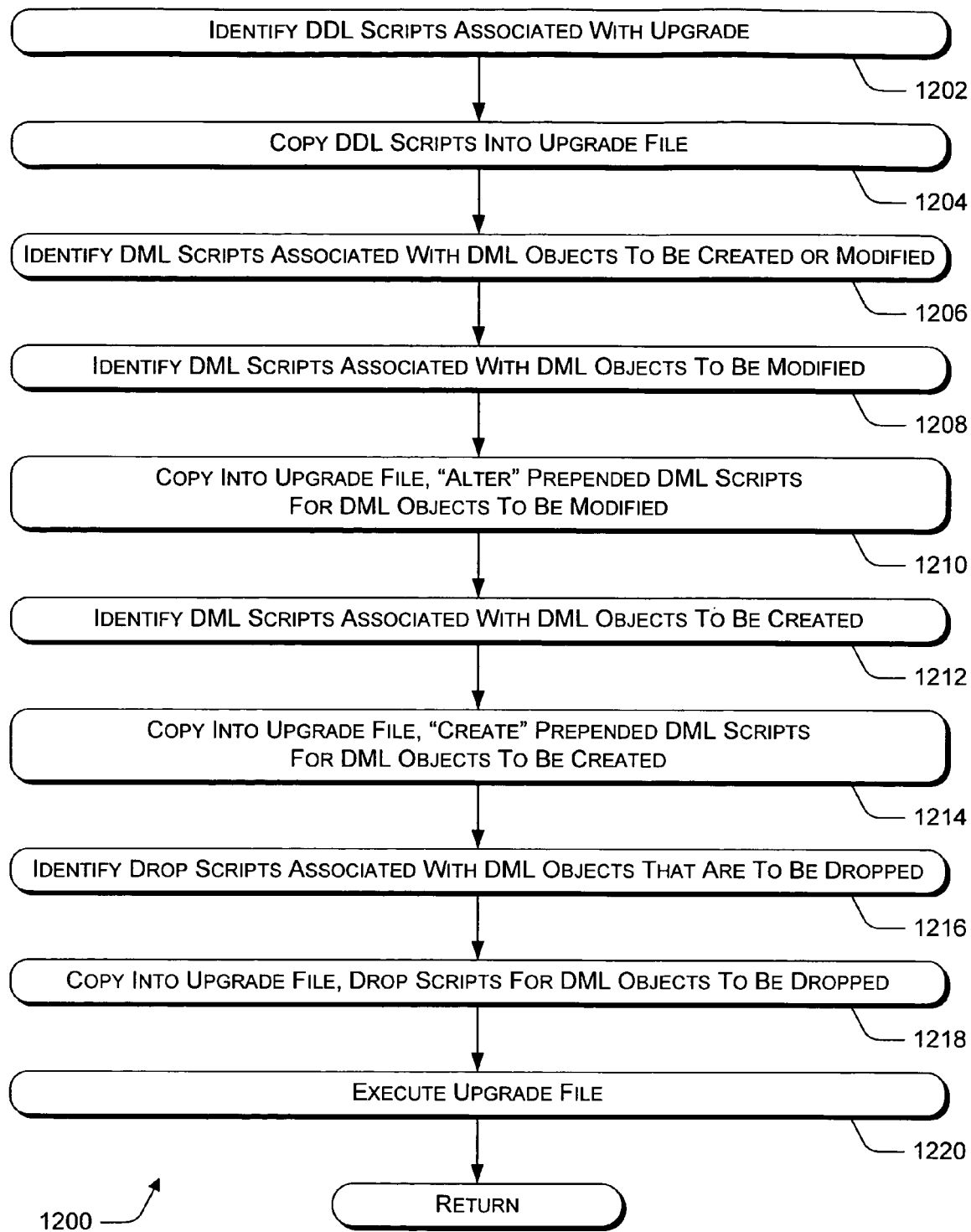
FIG. 12 is a flow diagram that illustrates an exemplary method for upgrading a relational database.

FIG. 12 is a flow diagram that illustrates an exemplary method 1200 for upgrading a relational database. The illustrated process can be implemented in any suitable hardware, software, firmware or combination thereof.

At block 1202, the system identifies scripts associated with data definition language (DDL) objects that are associated with any version of the database after the version being upgraded from, up to and including the version being upgraded to. For example, upgrade/installation file generator 910 examines data in XML file 904 to identify files containing DDL scripts associated with the versions of the database greater than the version being upgraded from, up to and including the version being upgraded to. An exemplary method for identifying DDL scripts to be added to the upgrade file is illustrated in FIG. 6*b*, and described above with reference to determination of set 604.

At block 1204, the system copies the identified DDL scripts into an upgrade file. For example, upgrade/installation file generator 910 extracts scripts from files indicated by the ddl elements identified in XML file 904, and copies the extracted scripts into an upgrade file.

At block 1206, the system identifies DML scripts associated with DML objects that have been created or modified between the version being upgraded from and the version being upgraded to. For example, upgrade/installation file generator 910 examines data in XML file 904 to identify files containing DML scripts associated with the versions of the database greater than the version being upgraded from, up to and including the version being upgraded to, not including DML scripts for DML elements that have been dropped and not re-created between the version being upgraded from and the version being upgraded to. For example, upgrade/installation file generator 910 iteratively steps through the data stored in XML file 904 by release (beginning with the first version after the version being upgraded from), adding to a set, DML scripts specified by sproc elements and removing from the set DML scripts specified by drop elements. An exemplary method for identifying DML scripts associated with DML objects that have been added or modified is illustrated in FIG. 7, and described above with reference to determination of set 620.

At block 1208, the system identifies DML scripts associated with DML objects that have been modified between the version being upgraded from and the version being upgraded to. For example, upgrade/installation file generator 910 first examines data in XML file 904 to identify DML objects that are associated with the version of the database that is being upgraded from. (This corresponds to set 618 shown in FIG. 6*c*, and described above with reference thereto.) Upgrade/installation file generator 910 then performs an intersection between the set of DML scripts associated with DML objects present in the database version being upgraded from and the set of DML scripts associated with DML objects that are added or modified between the version being upgraded from and the version being upgraded to (the DML scripts identified as described above with reference to block 1206). An exemplary method for identifying DML scripts associated with DML objects that are modified is illustrated in FIGS. 6*a*-7, and described above with reference thereto.

At block 1210, the system copies to an upgrade file, the DML scripts associated with DML objects that have been modified between the version being upgraded from and the version being upgraded to (the DML scripts identified as described above with reference to block 1208). For example, upgrade/installation file generator 910 prepends an "alter" command to the identified data manipulation language (DML) scripts, and copies the scripts into the upgrade file.

At block 1212, the system identifies DML scripts that are associated with DML objects that have been newly created between the version being upgraded from and the version being upgraded to.

For example, as described above with reference to block 1206, upgrade/installation file generator 910 identifies a first set of DML scripts associated with DML objects that have been created or modified between the version being upgraded from and the version being upgraded to. An exemplary method for identifying this first set is illustrated in FIG. 7, and described above with reference thereto.

Upgrade/installation file generator 910 then identifies a second set of DML scripts associated with DML objects that have been modified between the version being upgraded from and the version being upgraded to. As described above with reference to block 1208, an exemplary method for identifying this second set is illustrated in FIG. 6*c* and is described above with reference thereto.

The system then determines a set of DML scripts associated with DML objects that have been newly created between the version being upgraded from and the version being upgraded to by finding the difference between the first set and the second set. This set is represented in FIG. 6*d* as set 608, and is described above with reference thereto.

At block 1214, the system copies to an upgrade file, the DML scripts associated with DML objects that have been added between the version being upgraded from and the version being upgraded to (the DML scripts identified as described above with reference to block 1212). For example, upgrade/installation file generator 910 prepends a "create" command to the identified data manipulation language (DML) scripts, and copies the scripts into the upgrade file.

In an alternate implementation, to ensure that new objects are created before existing objects are modified, the processing described with reference to block 1210 may actually be performed after the processing described with reference to block 1214.

At block 1216, the system identifies drop scripts that are associated with DML objects that have been dropped and not re-created between the version being upgraded from and the version being upgraded to. For example, as illustrated in FIG. 6*e*, and described thereto with reference to set 610, a set is created of drop scripts associated with versions after the version being upgraded from, up to and including the version being upgraded to. (This set corresponds to the union of sets 622, 624, . . . , 626, as illustrated in FIG. 6*e*.) The set of drop scripts for the upgrade is identified as the difference between this set and the set of DML scripts associated with DML objects that have been added or modified between the version being upgraded from and the version being upgraded to (the set identified as described above with reference to block 1206, and represented as set 620 in FIG. 6*e*).

At block 1218, the system copies to an upgrade file, the drop scripts associated with DML objects that have been dropped between the version being upgraded from and the version being upgraded to (the drop scripts identified as described above with reference to block 1216). For example, upgrade/installation file generator 910 prepends a "drop" command to the identified data manipulation language (DML) scripts, and copies the scripts into the upgrade file. In an alternate implementation, the drop elements in the XML file specify only the name of the procedure or function to be dropped, rather than specifying the name of a script file, as illustrated in FIG. 3. In such an implementation, upgrade/installation file generator 910 determines whether the specified name refers to a function or procedure, and generates a "drop procedure" or "drop function" call as appropriate.

As described above, to support creation of an upgrade file to upgrade any previous version of the database to any newer version of the database (even if the newer version is not the current version), script files may be organized in subdirectories that correspond to different versions of the database. Alternatively, a source version control system may be implemented to manage multiple versions of one or more script files.

At block 1220, the upgrade script is executed. For example, to upgrade a version installed on testing server 914, the upgrade file generated by upgrade/installation file generator 910 is copied to testing server 914. The scripts in the upgrade file are then executed to modify, create, and/or drop DDL and/or DML objects associated with the already installed version of the database to upgrade it to the new version of the database. In an exemplary implementation, the scripts in the upgrade file are executed as a single transaction that can be committed or rolled back in its entirety. This prevents a partial upgrade, which could be unstable, in an event that one of the DDL or DML scripts contains an error.

CONCLUSION

The systems and methods described above enable relational database schema version management. Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method for generating an installation file for a particular version of a relational database, the method comprising:
given a database system of a particular version, the particular version being unknown prior to execution of the method, determining the particular version of the relational database wherein metadata exists that describes a sequence of multiple versions of the relational database where each version is an upgrade from a previous version, and the particular version is not a first version in the sequence;
automatically determining a first set of scripts, the first set of scripts comprising data definition language (DDL) scripts associated with implementing the particular version of the relational database, wherein the first set of scripts are selected from a plurality of scripts, one or more of the plurality of scripts being not associated with implementing the particular version;
the automatically determining a first set of scripts comprising:
extracting a set $A_1$ comprising one or more filenames from metadata associated with a first version in the sequence, the one or more filenames associated with a file comprising a data definition language (DDL) script associated with the first version;
iteratively extracting a set $A_i$ comprising zero or more filenames from metadata associated with an $i^{th}$ version of the relational database, the zero or more filenames each associated with a file comprising a data definition language script to be executed when upgrading from version i−1 of the relational database to version i of the relational database, where i varies incrementally from 2 to j, where the particular version is j; and
determining the first set of scripts as a set theory union of sets $A_1, A_2, \ldots, A_j$;
automatically determining a second set of scripts, the second set of scripts comprising data manipulation language (DML) scripts associated with implementing the particular version of the relational database, wherein the second set of scripts are selected from a plurality of scripts, one or more of the plurality of scripts being not associated with implementing the particular version;
the automatically determining a second set of scripts comprising:
extracting a set $A_1$ comprising one or more filenames from metadata associated with a first version in the sequence, the one or more filenames associated with a file comprising a data manipulation language (DML) script associated with the first version;
iteratively extracting a set $A_i$ comprising zero or more filenames from metadata associated with an $i^{th}$ version of the relational database, the zero or more filenames each associated with a file comprising a data manipulation language script to be executed to add or modify a DML object when upgrading from version i−1 of the relational database to version i of the relational database, where i varies incrementally from 2 to j, where the particular version is j;
iteratively extracting a set $B_i$ comprising zero or more filenames from metadata associated with an $i^{th}$ version of the relational database, the zero or more filenames each associated with a file comprising a DML drop script to be executed to drop a DML object when upgrading from version i−1 of the relational database to version i of the relational database, where i varies incrementally from 2 to j, where the particular version is j; and
determining the second set of scripts $C_j$ by determining:

$$C_2 = [A_1 \cup A_2] - B_2;$$

$$C_3 = [C_2 \cup A_3] - B_3;$$

$$C_4 = [C_3 \cup A_4] - B_4;$$

$$\ldots$$

$$C_j = [C_{j-1} \cup A_j] - B_j;$$

and
generating an installation file comprising a set theory union of the first set of scripts and the second set of scripts.

2. The method as recited in claim 1 wherein the particular version is associated with a first version in a sequence of one or more versions of the relational database.

3. The method as recited in claim 1 wherein the automatically determining a first set comprises extracting a filename from metadata associated with the particular version, the filename associated with a file comprising a data definition language script.

4. The method as recited in claim 1 wherein the automatically determining a second set comprises extracting a filename from metadata associated with the particular version, the filename associated with a file comprising a data manipulation language script.

5. The method as recited in claim 1 wherein the generating an installation file comprises copying a data definition language script from a script file associated with the first set into the installation file.

6. The method as recited in claim 1 wherein the generating an installation file comprises copying a data manipulation language script from a script file associated with the second set into the installation file.

7. The method as recited in claim 6 wherein the copying further comprises prepending a create command to the data manipulation language script in the installation file.

8. The method as recited in claim 1 wherein the metadata comprises an XML file.

9. One or more computer-readable media having computer-readable instructions recorded thereon which, when executed by a computer, cause the computer to implement the method as recited in claim 1.

10. A method for generating an upgrade file to upgrade version i of a relational database to version j of the relational database, where j>i, the method comprising:
   determining a set A of data definition language (DDL) scripts that, when executed, perform creates, alters, and drops of DDL objects associated with version i of the relational database, resulting in DDL objects associated with version j of the relational database, wherein the determining a set A comprises:
      iteratively extracting sets $M_k$, each comprising zero or more filenames from metadata associated with a $k^{th}$ version of the relational database, where i<k<=j, the zero or more filenames each associated with a file comprising a data definition language script to be executed when upgrading from version k−1 of the relational database to version k of the relational database; and
      determining the set A as the set theory union of sets $M_{i+1}$, $M_{i+2}, \ldots, M_j$ ($A = M_{i+1} \cup M_{i+2} \cup \ldots \cup M_j$);
   determining a set B of data manipulation language (DML) scripts that, when executed, create DML objects that are associated with version j of the relational database, but that are not associated with version i of the relational database, wherein the determining a set B comprises:
      determining a set E of DML scripts that when executed:
         perform alters DML objects associated with version i and version j of the relational database, but that differ between version i and version j of the relational database; and
         perform creates of DML objects that are associated with version j of the relational database but that are not associated with version i of the relational database; and
      determining set B as the difference between sets E and C_(B=E−C);
   determining a set C of DML scripts that, when executed, modify DML objects that are associated with both version i and version j of the relational database, but that differ between version i and version j of the relational database, wherein the determining a set C comprises:
      determining a set E of DML scripts that when executed:
         perform alters of DML objects associated with version i and version j of the relational database, but that differ between version i and version j of the relational database; and
         perform creates of DML objects that are associated with version j of the relational database but that are not associated with version i of the relational database;
      determining a set $F_j$ of DML scripts that when executed, create DML objects associated with version j of the relational database; and
      determining set C as a set theory intersection of set E and set $F_j$ ($C = E \cap F_j$);
   determining a set D of DML drop scripts that, when executed, drop DML objects that are associated with version i of the relational database, but that are not associated with version j of the relational database, wherein the determining a set D comprises:
      determining a set E of DML scripts that when executed:
         perform alters of DML objects associated with version i and version j of the relational database, but that differ between version i and version j of the relational database; and
         perform creates of DML objects that are associated with version j of the relational database but that are not associated with version i of the relational database;
      iteratively determining a set $F_x$ of DML scripts that when executed, drop DML objects associated with version x−1 of the relational database that are not associated with version x of the relational database, where x varies incrementally from i+1 to j;
      determining a set G as the set theory union of sets $F_i$, $F_{i+1}, F_{i+2}, \ldots, F_j$ ($G = F_i \cup F_{i+1} \cup \ldots \cup F_{i+2}$); and
      determining set D as the difference between set G and set E_(D=G−E); and
   generating an upgrade file comprising a set theory union of sets A, B, C, and D ($A \cup B \cup C \cup D$).

11. The method as recited in claim 10 wherein the determining a set E comprises:
   iteratively determining a set $P_x$ of DML scripts that when executed will upgrade DML objects from version x−1 of the relational database to version x of the relational database, where x varies incrementally from i+1 to j ;
   iteratively determining a set $N_x$ of DML scripts that when executed will drop DML objects that are associated with version x−1 of the relational database but that are not associated with version x of the relational database, where x varies incrementally from i+2 to j ;
   iteratively determining a set $M_x$ of DML scripts that when executed will upgrade DML objects from version i of the relational database to version x of the relational database, where x varies incrementally from i+1 to j, and where:

$M_{i+1} = P_{i+1}$ $M_{i+2} = [M_{i+1} \cup P_{i+2}] - N_{i+2}$ $M_{i+3} = [M_{i+2} \cup P_{i+3}] - N_{i+3}$

. . .

$M_j = [M_{j-1} \cup P_j] - N_j$; and determining set $E = M_j$.

12. The method as recited in claim 10 wherein the determining a set $F_j$ comprises:
   extracting a set $M_1$ comprising one or more filenames from metadata associated with a first version in a sequence of multiple versions of the relational database, the one or more filenames associated with a file comprising a data manipulation language (DML) script associated with the first version;
   iteratively extracting a set $M_x$ comprising zero or more filenames from metadata associated with version x of the relational database, the zero or more filenames each associated with a file comprising a DML script to be executed to add or modify a DML object when upgrading from version x−1 of the relational database to version x of the relational database, where x varies incrementally from 2 to j;

iteratively extracting a set $B_x$ comprising zero or more filenames from metadata associated with version x of the relational database, the zero or more filenames each associated with a file comprising a DML drop script to be executed to drop a DML object when upgrading from version x−1 of the relational database to version x of the relational database, where x varies incrementally from 2 to j; and determining the set $F_j$ by determining:

$$F_2 = [M_1 \cup M_2] - B_2,$$

$$F_3 = [F_2 \cup M_3] - B_3,$$

$$F_4 = [F_3 \cup M_4] - B_4,$$

...

$$F_j = [F_{j-1} \cup M_j] - B_j.$$

* * * * *